United States Patent [19]

Ohtani et al.

[11] 4,295,947

[45] Oct. 20, 1981

[54] PHOTO-CURABLE COATING COMPOSITIONS FOR BUILDING MATERIALS

[75] Inventors: Eiichi Ohtani; Kengo Kobayashi; Asao Isobe; Shigeyoshi Tanaka, all of Hitachi, Japan

[73] Assignee: Hitachi Chemical Company, Ltd., Tokyo, Japan

[21] Appl. No.: 74,660

[22] Filed: Sep. 12, 1979

[30] Foreign Application Priority Data

Sep. 18, 1978 [JP] Japan .................................. 53-114371

[51] Int. Cl.$^3$ .......................... C08F 2/50; B32B 27/16
[52] U.S. Cl. .......................... 204/159.15; 204/159.19; 525/455; 525/522; 525/920; 525/922
[58] Field of Search ............... 525/522, 902, 922, 455; 204/159.15

[56] References Cited

U.S. PATENT DOCUMENTS

| | | | |
|---|---|---|---|
| 2,839,488 | 6/1958 | Harvey et al. | 525/522 |
| 3,091,532 | 5/1963 | Michaelsen | 204/159.14 |
| 3,121,703 | 2/1964 | Harvey | 525/522 |
| 3,373,221 | 3/1968 | May | 260/31.2 R |
| 4,205,018 | 5/1980 | Nagasawa et al. | 204/159.15 |

Primary Examiner—John C. Bleutge
Assistant Examiner—A. H. Koeckert
Attorney, Agent, or Firm—Frishauf, Holtz, Goodman & Woodward

[57] ABSTRACT

A photo-curable coating composition for building materials which comprises
(a) an isocyanate-modified epoxy ester obtained by the reaction of an acrylic or methacrylic ester of an epoxy compound having not less than two epoxy groups in the molecule with a polyisocyanate;
(b) a photopolymerizable monomer being copolymerizable with the epoxy ester (a);
(c) a ketone resin;
(d) a photo-sensitizer; and
(e) a sensitizing auxiliary.

2 Claims, No Drawings

PHOTO-CURABLE COATING COMPOSITIONS FOR BUILDING MATERIALS

The invention relates to photo-curable coating compositions for building materials having a superior water resistance. In recent years, use of photo-curable resins for setting of coated films by light irradiation at the normal temperature and at the high speed has been attracting public attention, in place of thermal setting or setting at the normal temperature by drying for a long period of time. In the meantime, coating paints for exterior building materials, such as roofing tile, slate, coloured sheet zinc, aluminum sash and plastic board are required to show a nice appearance and resistance against fading and good weather resistance and water resistance. Coating paints for interior building materials, such as materials for wall, floor, ceiling, furniture and so on, for example, asbestos cement-calcium silicate plate (refer to JIS A5418), asbestos slate plate (refer to JIS A5403), mortar cement, clay plate, plastics, wood materials, paper materials and the like are also required to show a nice appearance, to be resistant against fading and to be excellent in water resistance, anti-staining property and solvent resistance. Heretofore, baking type paints have been used in order to satisfy these requirements. However, there still remain problems that large thermal energy is needed for baking, that uneven setting of coated film tends to occur due to scattering of thermal conduction to the material, and that long processing time is needed for such processes as heating, elevation of temperature and cooling. The invention is to overcome the above-mentioned problems and provide photo-curable coating compositions for building materials having superior appearance, anti-staining property, solvent resistance and water resistance, by setting a coated film at the normal temperature for a short period of time.

The invention, therefore, relates to photo-curable coating compositions for building materials which comprise (a) an isocyanate-modified epoxy ester obtained by the reaction of an acrylic or methacrylic ester of an epoxy compound having not less than two epoxy groups in the molecule with a polyisocyanate; (b) a photopolymerizable monomer being copolymerizable with the epoxy ester (a); (c) a ketone resin; (d) a photosensitizer; and (e) a sensitizing auxiliary, the amounts of the constituents (a) to (e) being as follows:

| | | | |
|---|---|---|---|
| $0/100$ | $\leq (b)/(a) + (b)$ | $\leq 70/100$ | (weight ratio) |
| $1/100$ | $\leq (c)/(a) + (b)$ | $\leq 50/100$ | (weight ratio) |
| $0.5/100$ | $\leq (d) + (e)/(a) + (b)$ | $\leq 15/100$ | (weight ratio) |
| $0/1$ | $\leq (e)/(d)$ | $\leq 3/1$ | (molar ratio) |

Epoxy compounds which are starting materials for preparing the isocyanate-modified epoxy ester are compounds having not less than two epoxy groups in the molecule, such as diglycidyl ethers obtained by the reaction of bispheols, e.g., Bisphenol A or hydrogenation products thereof with epichlorohydrin, diglycidyl esters obtained by the reaction of aromatic dicarboxylic acids or hydrogenation products thereof with epihalohydrins, and polyglycidyl ethers obtained by the reaction of alkanepolyalcohols with epichlorohydrin. It is preferable that the epoxy equivalent ranges from 100 to 1,500, more preferably from 140 to 1,000. They may be used alone or in combination.

Acrylic or methacrylic esters of the above-mentioned epoxy compounds may be obtained by ester-addition reaction of the above-mentioned epoxy compounds with acrylic or methacrylic acid. The reaction may be performed by mixing an epoxy compound with acrylic or methacrylic acid so that the equivalents ratio of epoxy group/carboxyl group will be 1/0.5–1/1, preferably 1/0.8–1/1, and by heating the mixture at 60°–120° C. in the presence of an alkaline catalyst to reach an acid value of 0–20, according to a conventional method.

The thus-obtained acrylic or methacrylic esters of epoxy compound are polyhydroxy compounds having hydroxyl groups.

The isocyanate-modified epoxy esters (a) according to the invention may be obtained by the reaction of the polyhydroxy compound with a polyisocyanate, bridging the acrylic or methacrylic esters of epoxy compound with the polyisocyanate intermolecularly to give a higher polymer. In this reaction, the distribution of molecular weight may be adjusted by varying the amount of polyisocyanate to be used. The reaction may be performed, according to an ordinary method, in the absence or presence of a catalyst such as tin compounds, for example, dibutyltin dilaurate, dibutyltin di-2-ethylhexanoate, dibutyltin diacetate at 20° C. to 80° C., by adjusting the ratio of hydroxyl groups (OH groups) in acrylic or methacrylic ester of epoxy compound to isocyanate groups (NCO groups) in polyisocyanate compound so that the equivalent ratio NCO groups/OH groups will be 0.2/1–1/1, preferably 0.3/1–0.7/1. More than 1 equivalent ratio will leave free NCO groups and less than 0.2/1 equivalent ratio will not give highly polymerized compounds, thus causing poor setting.

As the polyisocyanate are included, for example, tolylene diisocyanate, xylene diisocyanate, hexamethylene diisocyanate, isophorone diisocyanate, lysine diisocyanate, 2,2,4-trimethylhexamethylene diisocyanate, cyclohexylmethane diisocyanate, methylcyclohexane diisocyanate, isopropylidene-bis(4-cyclohexyldiisocyanate) and hexamethylene diisocyanate/biuret. Also included are compounds formed by reacting the above-mentioned polyisocyanates with a polyalcohol, such as propanediol, butanediol, hexanediol, polyethylene glycol, trimethylolpropane and pentaerythritol having a part of, preferably not less than two remaining isocyanate groups in one molecule.

The photo-curable resin compositions of the invention may contain, if necessary, a photopolymerizable monomer together with the (a) constituent as the photopolymerizable constituent. Such photopolymerizable monomer include, for example, acrylic esters such as methyl acrylate, ethyl acrylate, butyl acrylate, 2-ethylhexyl acrylate, decyl acrylate, cyclohexyl acrylate, ethylene glycol diacrylate, 1,6-hexanediol diacrylate, butanediol diacrylate, neopentyl glycol diacrylate, polyethylene glycol diacrylate and trimethylolpropane triacrylate; and methacrylic esters such as methyl methacrylate, ethyl methacrylate, butyl methacrylate, 2-ethylhexyl methacrylate, cyclohexyl methacrylate, ethylene glycol dimethacrylate, 1,6-hexanediol dimethacrylate, butanediol dimethacrylate, neopentyl glycol dimethacrylate, polyethylene glycol dimethacrylate and trimethylolpropane trimethacrylate. In addition, oligomers such as urethane acrylate, polyester acrylate and the like may be included as the photopolymerizable constituents. The urethane acrylate means a compound of relatively low molecular weight which can be obtained by the reaction of the abovementioned polyisocyanate compound with the hydroxyalkyl acrylate or methacrylate and which has photopolymerizable unsaturated bonds. The polyester acrylate means a compound obtained by the reaction of acrylic or methyacrylic acid with a hydroxyl group-containing polyester oligomer which can be obtained by the reaction of a polybasic acid such as phthalic acid, hexahydrophthalic acid, adipic acid, cebacic acid and the like with a polyhydric alcohol such as ethylene glycol, propylene glycol, butanediol, an oxyalkylene glycol, trimethylol propane and so on. The amount of the photopolymerizable monomer to be used in the invention will range from 0 to 70% by weight, preferably from 30 to 50% by weight based on the total weight of the photopolymerizable constituent. Use of more than 70% by weight of the photopolymerizable monomer will impair characteristics of coated film as a whole obtained when the photocurable composition is applied to coating materials.

The above-mentioned photopolymerizable constituent has preferably no unsaturated double bonds other than the photopolymerizable unsaturated bond in respective molecules.

In other words, when the compound having no carbon-to-carbon unsaturated bond other than the photopolymerizable carbon-to-carbon unsaturated bonds are used, they are useful as coating materials for exterior building materials in particular due to the fact that such compounds have superior weather resistance.

The ketone resins to be employed in the invention are compounds synthesized by condensation of a ketone compound such as cyclohexanone, acetophenone, methyl ethyl ketone and acetone with an aldehyde such as formaldehyde. They are commercially available under the trade name such as Hilac 111, 222, 901, 400B, 112T (all available from Hitachi Chemical Co., Ltd.), Kunsthary AFS (available from Bayer AG) and Synthetic Resin SK (available from Chemische Werke Huls).

The amount of ketone resin to be used will range from 0.5 to 18% by weight, preferably from 1 to 11% by weight based on the weight of photopolymerizable constituent, whereby practically sufficient water resistance may be attained. Use of too small amount of ketone resin will give no improvement in water resistance, whereas use of too much amount of it will cause insufficient setting.

The photo-curable coating composition of the invention may contain a photo-sensitizer or a photo-sensitizer and a sensitizing auxiliary. The sensitizer includes carbonyl compounds, such as benzophenone, benzoin, benzoin methyl ether, benzoin ethyl ether, benzoin isopropyl ether, benzil, diacetyl, acetophenone and anthraquinone. Also included are sulfides and halides in the sensitizer. The sensitizing auxiliary includes alkyl- and alkanol-amines such as triethylamine, 2-dimethylaminoethanol, N-methyl diethanolamine, triethanolamine, 3-dimethylamino-1-propanol and 2-dimethylamino-2-methyl-1-propanol. The photo-sensitizers are used alone or in combination with sensitizing auxiliaries. The amount of sensitizers alone or that of sensitizers and sensitizing auxiliaries to be used will range from 0.5 to 15% by weight, preferably from 2 to 8% by weight based on the weight of photopolymerizable constituents. The ratio of sensitizing auxiliaries to photo-sensitizers will vary from 0/1 to 3/1. The sensitizing auxiliary may preferably be used in an amount of not less than 0.3 mole per one mole of the photo-sensitizers for the purpose of playing a sufficient role. The use of excess amount is wasteful.

The resin compositions of the invention may further contain various additives, for example, polymers such as acrylic resin, polyester resin, polyethylene, polypropylene and polyvinyl acetate; pigments such as titanium white, spherical or lamellar fillers which reflect or transmit light such as aluminum powder, mica, talc and kaolin; plasticizers such as diallyl phthalate; and dyestuffs in order to improve their properties.

The invention is further explained by the following Examples and Comparisons.

EXAMPLE 1

Into a reaction vessel were placed 192 parts by weight of a hydrogenated Bisphenol A type diglycidyl ether having an epoxy equivalent of 240 (Adeka Resin EP-4080 available from Asahi Denka Kogyo K.K., trade name), 192 parts by weight of a diglycidyl hexahydrophthalate having an epoxy equivalent of 160 (Showdine 540 available from Showa Denko K.K., trade name), 144 parts by weight of acrylic acid, 1 part by weight of triethylamine and 0.1 part by weight of hydroquinone, and the mixture was heated at 90°–100° C. for about 15 hours with stirring to give a compound (epoxy acrylate) having acid value of 10. Into the vessel were added 500 parts by weight of diethylene glycol diacrylate to give a homogeneous solution, then 100 parts by weight of methyl ester of lysine isocyanate (Lysine Isocyanate M-100 available from Toray Industries Inc., trade name) were added dropwise at 60° C.

The mixture was heated with stirring for 6 hours and the reaction was continued until isocyanate groups dissipated. To the thus-obtained resin solution were added 50 parts by weight of a ketone resin (Hilac 222 available from Hitachi Chemical Co., Ltd., trade name), 50 parts by weight of benzophenone and 30 parts by weight of dimethylaminoethanol, affording a photo-curable coating composition.

EXAMPLE 2

A mixture of 136 parts by weight of a Bisphenol A type diglycidyl ether, having an epoxy equivalent of 170 (Epikote 828 available from Shell Chemical Co., Ltd., trade name), 240 parts by weight of a diglycidyl phthalate having an epoxy equivalent of 200 (Showdine 508 available from Showa Denko K.K., trade name), 144 parts by weight of acrylate acid, 1.0 part by weight of triethylamine and 0.1 part by weight of hydroquinone was heated at 90°–100° C. for 15 hours with stirring to give a compound having acid value of 10.

The compound was treated in all the same manner as in Example 1, affording a photo-curable coating composition for building materials.

EXAMPLE 3

The procedures of Example 1 were followed except that 100 parts by weight of tolylene diisocyanate were used in place of lysine diisocyanate, giving a photo-curable coating composition for building materials.

Comparison 1

Procedures of Example 1 were followed except that the ketone resin (Hilac 222) was not used, giving a photocurable coating composition.

Comparison 2

Procedures of Example 2 were followed except that the homogeneous solution obtained in Example 1 by adding diethylene glycol diacrylate to the epoxy acrylate was not reacted with methyl ester of lysine isocyanate, giving a photo-curable coating composition.

Each of the compositions obtained in Examples 1-3 and Comparisons 1 and 2 was coated on a flexible board with 50 μm thick which was irradiated with ultraviolet ray for setting, thus giving a test piece. The results are shown in Table 1.

TABLE 1

|  |  | Setting[1] property (second) | Pencil[2] hardness | Water resistance | | Anti-staining[5] property | Solvent[6] resistance | Heat[7] cycle |
| --- | --- | --- | --- | --- | --- | --- | --- | --- |
|  |  |  |  | warm[3] water | boiled[4] water |  |  |  |
| Example | 1 | 3 | H | O | O | O | O | O |
|  | 2 | 3 | H | O | O | O | O | O |
|  | 3 | 3 | H | O | O | O | O | O |
| Comparison | 1 | 3 | H | X | X | O | O | X |
|  | 2 | 5 | 2H | O | O | O | O | X |

Remarks:
Test 1.;
Each panel was placed at 10 cm. distance from a 2 KW (80W/cm.) high pressure mercury lamp. Time from commencement of irradiation with ultraviolet ray to dryness when touched with a finger was measured.
Test 2.;
Mitsubishi Pencil Uni was used.
Test 3.;
Each test piece was dipped in a warm water at 40° C. for 20 days.
O: nothing extraordinary
X: extraordinary (whitened)
Test 4.;
Each test piece was dipped in a boiled water for 2 hours.
O: nothing extraordinary
X: extraordinary (whitened)
Test 5.;
On the surface of each coating film was drawn a line with an oily red Magic ink (a kind of marking ink). After allowed to stand at 25° C. for 24 hours, the ink was wiped off with an absorbent cotton impregnated with n-butanol.
O: The ink could be wiped off completely
X: A trace of the ink remained
Test 6.;
Each test piece was subject to a rubbing test with methyl ethyl ketone.
O: no problem with not less than 200 times of rubbing
X: damaged with not more than 30 times of rubbing
Test 7.;
Heat cycle [at −20° C. for 3 hours - at 80° C. for 3 hours - at room temperature for 18 hours] was repeated 20 times.
O: nothing extraordinary
X: Extraordinary (occurrence of swelling or cracking)

The test pieces obtained by using compositions of Examples 1-3 were excellently lustrous. As the results of outdoor exposure test for 1 month, the test piece according to Example 1 showed nothing extraordinary, while those according to Examples 2 and 3 turned to yellow.

From the above, it will be apparent that the photo-curable coating compositions for building materials of the invention have a superior water resistance, anti-staining property and solvent resistance and that they have also a superior weather resistance if they have no unsaturated bond other than photopolymerizable unsaturated bond in the photopolymerizable constituent. The photo-curable coating compositions of the invention are suitable especially for paints of exterior building materials such as roofing tile, slate, coloured sheet zinc, aluminum sash, plastic board and wood.

We claim:

1. A photo-curable coating composition for building materials which comprises
   (a) an isocyanate-modified epoxy ester obtained by the reaction of an acrylic or methacrylic ester of an epoxy compound having not less than two epoxy groups in the molecule with a polyisocyanate;
   (b) a photopolymerizable monomer being copolymerizable with the epoxy ester (a);
   (c) a ketone resin formed by condensation of a ketone with an aldehyde;
   (d) a photo-sensitizer; and
   (e) a sensitizing auxiliary,
   the amounts of the constituents (a) to (e) being as follows:

| | | | |
   |---|---|---|---|
   | $0/100$ | $\leq (b)/(a) + (b)$ | $\leq 70/100$ | (weight ratio) |
   | $1/100$ | $\leq (c)/(a) + (b)$ | $\leq 50/100$ | (weight ratio) |
   | $0.5/100$ | $\leq (d) + (e)/(a) + (b)$ | $\leq 15/100$ | (weight ratio) |
   | $0/1$ | $\leq (e)/(d)$ | $\leq 3/1$ | (molar ratio) |

2. The photo-curable coating composition as claimed in claim 1 wherein the amounts of the constituents (a) to (e) are as follows:

| | | | |
   |---|---|---|---|
   | $30/100$ | $\leq (b)/(a) + (b)$ | $\leq 50/100$ | (weight ratio) |
   | $3/100$ | $\leq (c)/(a) + (b)$ | $\leq 20/100$ | (weight ratio) |
   | $2/100$ | $\leq (d) + (e)/(a) + (b)$ | $\leq 8/100$ | (weight ratio) |
   | $0.3/1$ | $\leq (e)/(d)$ | $\leq 3/1$ | (molar ratio) |

* * * * *